(12) United States Patent
Frayssignes

(10) Patent No.: US 9,298,447 B2
(45) Date of Patent: Mar. 29, 2016

(54) METHOD AND DEVICE FOR THE MANAGEMENT OF SOFTWARE UPDATES OF A SET OF EQUIPMENT OF A SYSTEM SUCH AS AN AIRCRAFT SYSTEM

(71) Applicant: Airbus Operations (SAS), Toulouse (FR)

(72) Inventor: Anne Frayssignes, Saint-Andre (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 14/200,873

(22) Filed: Mar. 7, 2014

(65) Prior Publication Data
US 2014/0282479 A1    Sep. 18, 2014

(30) Foreign Application Priority Data
Mar. 12, 2013    (FR) ...................................... 13 52194

(51) Int. Cl.
*G06F 9/44*    (2006.01)
*G06F 9/445*    (2006.01)
*G06F 11/14*    (2006.01)

(52) U.S. Cl.
CPC .............. *G06F 8/65* (2013.01); *G06F 11/1433* (2013.01); *G06F 8/71* (2013.01)

(58) Field of Classification Search
CPC ...................................... G06F 8/65; G06F 8/71
USPC .................................................. 717/121, 168
See application file for complete search history.

(56) References Cited

U.S. PATENT DOCUMENTS

| 7,114,184 | B2 * | 9/2006 | Malivanchuk .......... G06F 21/56 |
| | | | 713/188 |
| 8,655,541 | B2 * | 2/2014 | You .............................. 701/29.1 |
| 2003/0158831 | A1 * | 8/2003 | Zaremba ........................... 707/1 |
| 2003/0200541 | A1 * | 10/2003 | Cheng et al. ................... 717/169 |
| 2004/0060044 | A1 | 3/2004 | Das et al. |
| 2009/0182782 | A1 | 7/2009 | Karve et al. |
| 2010/0235289 | A1 * | 9/2010 | Frayssignes et al. ......... 705/304 |
| 2012/0124567 | A1 * | 5/2012 | Landry ......................... 717/168 |

FOREIGN PATENT DOCUMENTS

FR    2943152    9/2010

OTHER PUBLICATIONS

French Search Report, Oct. 15, 2013.

* cited by examiner

*Primary Examiner* — Wei Zhen
*Assistant Examiner* — Lanny Ung
(74) *Attorney, Agent, or Firm* — Greer, Burns & Crain, Ltd.

(57) ABSTRACT

The management of software updates of a set of equipment of an aircraft system on the basis of instructions in a service bulletin, accessible in the form of commands. A command directed to at least one instruction in said service bulletin and being directed to the modification of the configuration of an item of equipment of said system is selected and executed. If the result of executing said selected command conforms to an expected result, at least one restore command allowing the reconfiguration of said equipment to its configuration preceding the execution of said command is selected. If the result of executing said selected command does not conform to an expected result, at least one previously generated restore command is executed.

13 Claims, 3 Drawing Sheets

METHOD AND DEVICE FOR THE MANAGEMENT OF SOFTWARE UPDATES OF A SET OF EQUIPMENT OF A SYSTEM SUCH AS AN AIRCRAFT SYSTEM

CROSS-REFERENCES TO RELATED APPLICATIONS

This application claims the benefit of the French patent application No. 1352194 filed on Mar. 12, 2013, the entire disclosures of which are incorporated herein by way of reference.

BACKGROUND OF THE INVENTION

The present invention relates to updating software applications and more particularly a method and a device for managing software updates of a set of equipment of a system such as an aircraft system, allowing in particular automatic reloading of an initial configuration following an error in updating one or more of the devices.

Generally, each aircraft manufactured is delivered to an airline in a particular configuration. However, since a technical solution may change over time, aircraft manufacturers generally implement improvement procedures according to which hardware and/or software elements are replaced by others.

Each part of the aircraft, mechanical, electronic or software, is identified by an invariant code, known as the FIN (Functional Item Number), denoting the function of the part and its location. Moreover, each of said parts comprises an identification number, known as the PNR (Part Number Reference), which identifies the technical solution applied to the mechanical, electronic or software part concerned to perform the function for which it is intended. A PNR can also be associated with a group of parts forming a functional assembly, also known as a Constituent Assembly, such as a landing gear assembly. A PNR is an identifier that is variable over time depending on the manufacturer and the version.

Thus, during the lifetime of an aircraft an element having the reference PNR1 may be replaced by an element having the reference PNR2, said elements having the same FIN code. The replacement of an element having a code PNR1 by another having a code PNR2 takes place through a configuration management process in which the individual element changed is known as a modification (MOD). The technical features of the change are described in a Technical Repercussion Sheet.

Manufacturers generally offer airlines the opportunity to benefit from improvements to the aircraft of which they have taken delivery. MODs are then applied to aircraft that have already been delivered according to the instructions in a Service Bulletin (SB). These bulletins are official documents used for notifying an airline of the modifications to be made to one or more aircraft that it is operating. They are generally produced by the manufacturers. However, they can also be issued by their suppliers. In this case, they must be validated by the manufacturer.

Like the MOD, a SB describes the state before application of the SB, for example use of the element having the code PNR1, and the state after application, for example use of the element having the code PNR2, the technical improvements provided by the new elements, and a description of the work to be carried out to replace the elements involved, for example the duration and the number and category of personnel necessary for application of the SB and the procedures to be applied.

According to a particular embodiment, described in particular in Patent Application FR 2 943 152, the SB is delivered in electronic form (known as an eSB). This makes it possible to automate certain equipment software update tasks, without changing hardware. Such equipment is generally updated using a central configuration management system, known as DLCS (Data Loading and Configuration System), which allows direct loading from an aircraft.

A significant feature of an eSB executed by a DLCS is the automatic reproduction of operations carried out by a maintenance operative. Said operations are, for example, as follows:

verifying the initial configuration of the equipment (typically avionics calculators) covered by the eSB, known as PRE-MOD, and, if applicable, verifying the configuration of other equipment in order to verify compatibility constraints (verification of mixability);

selecting the software elements for loading depending on the PRE-MOD configuration of the items of equipment;

verifying the completeness of the software elements for loading (typically the set comprising the new software elements and the software elements to be reloaded);

launching the loading of the software elements, possibly requiring adherence to a loading order for a given target item of equipment and for target items of equipment themselves (thus, for example, AFDX™ (Avionic Full DupleX) switches must generally be loaded in a particular order to avoid losing the AFDX™ network during loading);

verifying the configuration of the equipment after loading has been completed, known as POST-MOD; and displaying explanatory messages to a maintenance operative giving results of the type "OK" and "NOK" for each step, instructions and help information.

However, although such a solution is often effective, it can be improved. When one or more equipment updates fail, the intervention of a maintenance operative is necessary to determine if the update must be retried or not and, if applicable, to reconfigure the system to its initial state (PRE-MOD).

Thus, by way of illustration, considering three calculators C1, C2, C3 and C4 each comprising software elements L1, L2, L3 and L4 in their version n and requiring migration to a version n+1, it is assumed that the update of calculators C1 and C2 takes place correctly, as well as the update of software element L1 on calculator C3, but that an error occurs during the update of software element L2 on calculator C3.

In this case, the maintenance operative assumes control of the update process and retries the update of software element L2 on calculator C3. After several unsuccessful attempts, the operative decides to reconfigure the system to its initial version (n) so as not to immobilize the aircraft for too long. To this end, he must reload software elements L1, L2, L3 and L4, in their version n, onto calculators C1 and C2 and reload software elements L1 and L2, in their version n, onto calculator C3.

Such procedures are time-consuming and have a significant impact on aircraft availability.

It is noted here that the loss of time and the possibility of operator error are increased, in particular, by the number of software elements for loading, the number of target items of equipment concerned and the moment at which the error occurs (if the update fails during the update of the first software element of the first target item of equipment, less effort is required to restore the original configuration than if the failure occurs on the last software element of the last target item of equipment).

It is also noted that if the type of equipment on which an update fails has not thus far experienced any particular update problems, the maintenance operative would tend to retry loading the software element regardless of the type of error encountered. If, on the other hand, the type of equipment on which an update fails has regularly experienced update problems, the operative, as a result of his experience, would tend not to check the error messages generated by the loading protocol and risk deciding directly to return to the initial configuration, possibly missing the opportunity of successful installation if he had retried the update.

The invention makes it possible to solve at least one of the problems set out above.

SUMMARY OF THE INVENTION

The invention thus relates to a computerized method for the management of software updates of a set of equipment of a system based on instructions in a service bulletin, the instructions in said service bulletin being accessible in the form of commands, the method comprising the following steps, selecting and executing a command directed to at least one instruction in said service bulletin, said selected command being directed to the modification of the configuration of an item of equipment of said system;

if the result of executing said selected command conforms to an expected result, generating, according to the type of said executed command, at least one restore command, said at least one restore command allowing the reconfiguration of said equipment to its configuration preceding the execution of said selected command; and if the result of executing said selected command does not conform to an expected result, executing at least one previously generated restore command.

The method according to the invention thus makes it possible to avoid loss of automation in executing the loading of software elements onto several target items of equipment following a first failure of loading a software element onto a target item of equipment. It allows the automatic restoration of the initial configuration in the event of failure, in particular repeated failures, of the loading of a software element onto a target item of equipment.

The method according to the invention can be used with service bulletins requiring a change of a hardware element, i.e. an intervention by an operative, and with service bulletins relating to calculators that do not have means allowing them to reboot after a software update and/or are provided with complex safety functions for switching to a loading mode.

The method according to the invention offers interactivity and synchronization functions making it possible to optimize automated functions and remote operations of an on-board loading system.

According to a particular embodiment, the method further comprises a step of executing a configuration test command of said equipment, said configuration test command being executed before executing said selected command, at least one parameter of said generated restore command corresponding to a result of executing said configuration test command.

Still according to a particular embodiment, the method further comprises a step of generating a configuration test restore command of said equipment, at least one parameter of said test configuration restore command corresponding to a result of executing said configuration test command.

According to a particular embodiment, said configuration test command of said equipment is directed to at least one instruction in said service bulletin.

Still according to a particular embodiment, the method further comprises a step of concatenation of previously generated restore commands, said previously generated restore commands being concatenated in an order defined by a sequence number associated with said previously generated restore commands.

Still according to a particular embodiment, the method further comprises a step of generating a restore command for displaying a message intended for an operative. Said message display restore command is for example generated when said selected command is directed to the configuration of a new item of equipment.

Still according to a particular embodiment, the method further comprises a step of evaluating a selection criterion in the event of failure of execution of said selected command, said step of execution of said selected command being repeated if said selection criterion is verified.

The method according to the invention thus makes it possible, in particular, depending on the reliability of loading of a given item of equipment, to determine if a further update attempt must be carried out or if the initial configuration should be restored.

According to a particular embodiment, said selection criterion is based on a number of software elements successfully loaded onto said equipment, a number of software elements for loading onto said equipment, a number of items of equipment the configuration of which must be modified, and/or an error code of execution of said selected command.

Still according to a particular embodiment, the method further comprises a step of counting the number of executions of said selected command, the execution of said selected command only being possible a limited number of times determined by a pre-set threshold.

Still according to a particular embodiment, the method also comprises a step of generating a synchronization restore command for the execution of restore commands.

Still according to a particular embodiment, the method further comprises a step of generating a restore command for receiving at least one item of data for the execution of restore commands.

A further object of the invention is a computer program comprising instructions for carrying out each of the steps of the method previously described when said program is loaded and executed on a computer, a device comprising means for carrying out each of the steps of the method previously described, and an aircraft comprising said device.

The advantages procured by said computer program, said device and said aircraft are similar to those previously mentioned.

BRIEF DESCRIPTION OF THE DRAWINGS

Further advantages, aims and features of the present invention will become apparent from the following detailed description, given as a non-limitative example, with reference to the attached drawings, in which.

DETAILED DESCRIPTION OF THE PREFERRED EMBODIMENTS

Figure 1:
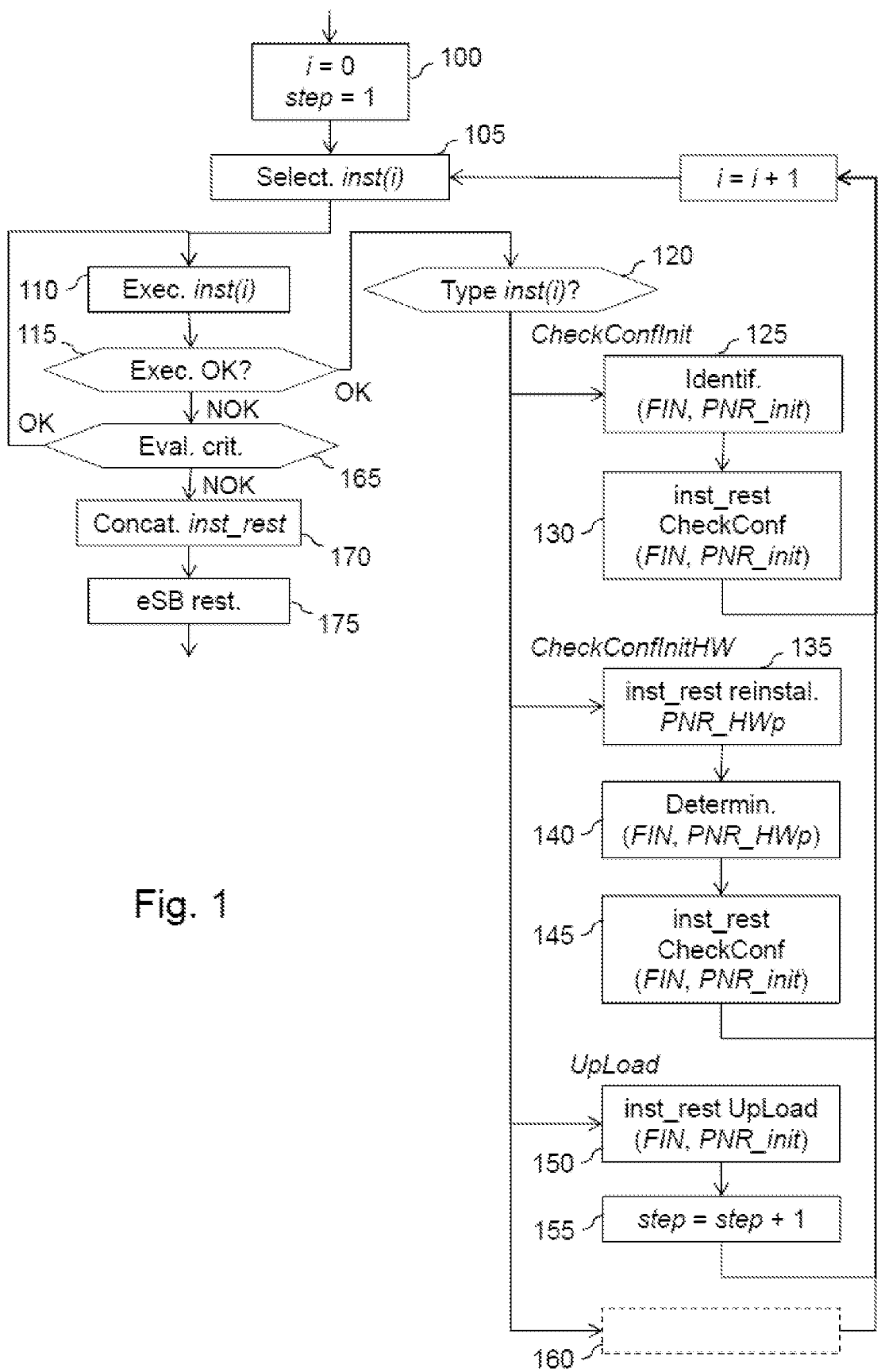
FIG. 1 shows diagrammatically certain steps of an algorithm making it possible to relaunch the loading of a software element onto an item of equipment and/or to reset equipment following detection of a loading error of a software element.

In general terms, according to a particular embodiment, the invention allows the automatic management of restore points in the event of failure to load during the execution of an eSB, including the decision-making and automatic execution of further loading attempts until correct loading is achieved and/or in the event of repeated failure, the initial configuration is restored.

Decision-making is advantageously based on the allocation of "loading reliability" criteria for a given item of equipment and on the allocation of "recoverability" criteria for the errors encountered.

Still according to a particular embodiment, the constitution of a restore point is principally based on identifying a "PRE-MOD" configuration of each item of equipment affected by an eSB and on the automatic and dynamic construction (i.e. as the execution of the eSB progresses), by the loading system, of a "restore script" using the same syntax and the same organization as an eSB. Such a restore script, hereinafter referred to as the restore eSB, can thus be executed like a standard eSB.

When a loading error is detected, or more generally when an eSB command execution error is detected, a selection criterion is evaluated to determine if the loading or the execution of the command should be retried or, on the other hand, the system must be reconfigured to its initial configuration (PRE-MOD).

Such a selection criterion can be coded in an eSB itself, thus allowing the use of different criteria according to the items of equipment involved, for example depending on a known history of the likelihood of a calculator having loading failures, or configured using external configuration data that can be determined, for example, by airline.

By way of illustration, such a selection criterion can represent the ratio of the number of items of equipment having correctly completed the loading of all the software elements to be loaded onto them, to the number of items of equipment that must load one or more software elements. If the value of said ratio is greater than a predetermined (or dynamically determined) threshold, the central configuration management system (also known as dataloader) relaunches the loading of the software element that gave rise to the detected error.

Said selection criterion is, preferably, associated with a maximum number of attempts to avoid causing blockage to the system. The number of attempts to load a software element onto an item of equipment can thus be limited to three. That value can be set along with the selection criterion.

Still by way of illustration, said selection criterion can represent the ratio of the number of software elements correctly loaded onto an item of equipment (e.g. the item of equipment that caused the error in question or an item of equipment currently loading software elements) to the number of software elements to be loaded onto said item of equipment. If the value of said ratio is greater than a predetermined or dynamically determined threshold, the central configuration management system relaunches the loading of the software element that gave rise to the detected error. Again, a maximum number of attempts is, preferably, associated with the selection criterion.

Also by way of illustration, said selection criterion can represent an indicator of the severity of the loading error. Such an indicator can in particular be based on an error code, for example an error code defined in a loading standard such as standards A615A (AFDX™/Ethernet bus), A615-3 (A429 bus) and A826 (CAN or Controller Area Network bus) or any other standard. From an error code, the central configuration management system determines a severity indicator for the loading error using a specific algorithm or a look-up table that can, for example, be preloaded during the configuration of the central configuration management system. If the value of said indicator is greater than a predetermined or dynamically determined threshold, the central configuration management system relaunches the loading of the software element that gave rise to the detected error. Again, a maximum number of attempts is, preferably, associated with the selection criterion.

The selection criterion can also correspond to a combination of said criteria.

According to the configuration of the central configuration management system, it is possible to automatically call a reset command or a command to switch the electricity supply on/off, before relaunching the loading of the software element that gave rise to the detected error (following the evaluation of the selection criterion and the result of its comparison with a threshold).

Similarly, an interface comprising in particular a human-machine interface can be called automatically before relaunching the loading of the software element that gave rise to the detected error (following the evaluation of the selection criterion and the result of its comparison with a threshold) in order to request decisions or confirmations from an operative. Such an interface can also allow the exchange of data with other systems.

Commands that can be used in eSBs can generally be chained together, depending on their result (e.g. "OK" or "NOK") or not, to control the sequences of commands executed conditionally or not. In particular, commands of the CheckConf type exist for obtaining the software configuration of elements of an item of equipment and commands of the UpLoad type exist for loading a software element onto an item of equipment. A command of the UpLoad type can thus be executed automatically after a command of the CheckConf type provided that the latter returns a result of the "OK" type. It is thus possible to obtain a state of initial configuration of items of equipment (PRE-MOD) before loading software elements. Said state can be used to reset the configuration of a system when there is a persistent loading error.

According to a particular embodiment, the central configuration management system determines, during the execution of the commands in an eSB, the configuration of the equipment onto which software elements are loaded.

More specifically, the central configuration management system determines the pair (FIN, PNR) of the software elements that are the subject of loading before loading takes place, thus allowing the reconfiguration of the equipment to its initial configuration (PRE-MOD) if a loading problem is detected. Said pairs are stored with a sequence number. Similarly, information about the operations of replacing equipment and loading software elements onto said equipment is determined and stored in order to allow a return to the initial configuration if a loading error is detected.

To this end, each command of the CheckConf type in the eSB relating to determining an initial configuration is analyzed, when its result is of the "OK" type, to identify the (FIN, PNR_init) pair. Moreover, a restore command is generated to verify a final configuration after reconfiguration, i.e. to verify that the PNR_init identification number is associated with the FIN code after reconfiguration. Said command is stored in a set of restore commands, for example a file. The restore commands are only used when it is necessary to reconfigure equipment to an initial configuration (PRE-MOD).

Similarly, each command of the CheckConf type in the eSB relating to a FIN code of an item of equipment associated with a new identification number is analyzed so as to, in particular, generate a restore command for the purpose of requesting, for example using a pop-up type display window, the reinstallation of the previous item of equipment for the FIN code in question. As described hereinafter, such a command can be combined with a command to synchronize, reset or switch the electricity supply on/off to wait for the equipment to be operational, after reconfiguration, in order to test its configuration. Moreover, a second restore command is generated to verify a final configuration after reconfiguration, i.e. to verify that the PNR_init identification number (corresponding to the previous item of equipment for the FIN code in question) is associated with the FIN code after reconfiguration. Said commands are stored in a set of restore commands, for example a file.

Moreover, each command of the UpLoad type in the eSB relating to the loading of a software element having the PNR_new identification number associated with the FIN code, is, in the event of success (e.g. result of the "OK" type), analyzed so as to, in particular, generate a restore command of the UpLoad type relating to the loading of a software element having the PNR_init identification number associated with the FIN code. Said command is stored in a set of restore commands, for example a file, with a sequence number that is then incremented.

During the execution of commands of the UpLoad type in the eSB, in the event of failure (e.g. the result is "NOK") and if, according to the selection criterion, equipment must be reconfigured to an initial state (with or without confirmation from a maintenance operative), the previously generated restore commands are concatenated in a specific eSB allowing the reconfiguration of the equipment according to a conventional eSB execution scheme. Such an eSB can be generated and executed automatically, with or without confirmation from a maintenance operative.

FIG. 1 shows diagrammatically certain steps of an algorithm making it possible to relaunch the loading of a software element onto an item of equipment and/or to reset equipment following detection of a software element loading error.

As shown, a first step (step 100) is intended here to set the variables i and step to the values zero and one, respectively, i representing an index of the commands in an eSB and step representing an index of restore configuration commands generated for the purpose of creating a restore eSB.

In subsequent steps, the command in the eSB currently being processed, having the index i, denoted inst(i), is selected (step 105) then executed (step 110). A test is then carried out to determine if the execution of the selected instruction has progressed normally or not (step 115), i.e., for example, if its result has the value "OK" or the value "NOK".

If the execution of the selected command has taken place normally, a test is carried out to determine the type of the selected command (step 120).

If a command of the CheckConfigInit type is concerned, i.e. a command of the CheckConfig type the purpose of which is to determine the configuration of a software element of an item of equipment before modifying it, the pair formed by the associated FIN code and PNR_init identification number is determined (step 125). Said values are typically obtained from the selected command. A restore command of the CheckConf type, the parameters of which correspond to the (FIN, PNR_init) pair, is then generated and temporarily stored (step 130). The value of the index i is then incremented by one and, if it is present, the next command in the eSB is selected (step 105) for processing in turn.

If the selected command is a command of CheckConfigHW type, i.e. a command of CheckConfig type relating to a change of equipment (FIN code allocated a new identification number PNR_new), a restore command the purpose of which is to request, for example using a pop-up type display window, the reinstallation of the previous item of equipment the identification number of which is PNR_HWp, for the FIN code in question, is generated (step 135). As previously indicated, such a command can be combined with a command to synchronize, reset or switch the electricity supply on/off in order to wait until the equipment is operational, after reconfiguration, to test its configuration.

The PNR_HWp identification number corresponding to the previous item of equipment for the FIN code in question is then determined (step 140) and a second restore command is generated to verify a final configuration after reconfiguration (step 145), i.e. to verify that the PNR_init identification number (corresponding to the PNR_HWp identification number) is associated with the FIN code after reconfiguration. Said restore commands are temporarily stored. The value of the index i is then incremented by one and, if it is present, the following command in the eSB is selected (step 105) for processing in turn.

If the selected command is a command of the UpLoad type (the purpose of which is the loading of a software element), a restore command of the UpLoad type is generated (step 150) with, as parameters, the (FIN, PNR_init) pair as defined by the previous execution of a previous command of the CheckConfigInit type. Said command is temporarily stored with a sequence number the value of which is equal to that of the variable step, which is then incremented by one (step 155). The value of the index i is then incremented by one and, if it is present, the next command in the eSB is selected (step 105) for processing in turn.

If a command of another type is concerned, suitable processing can be carried out if necessary (step 160).

If the execution of the selected command has not taken place normally (step 115), a selection criterion such as that previously described is evaluated (step 165).

If the selection criterion is met, the algorithm returns to step 110 and the selected command is repeated. Otherwise, if the selection criterion is not met and, if appropriate, after confirmation by an operative, the equipment the configuration of which was modified by the eSB during execution is reconfigured according to the initial configuration.

To this end, the temporarily stored commands are concatenated in a restore eSB (step 170) while taking account of the sequence numbers. The restore eSB is then executed (step 175), in a conventional manner, to allow the reconfiguration of equipment according to the temporarily stored commands, in the order of the sequence numbers.

As previously described, an interface can be implemented during the execution of eSB, and therefore of the restore eSB, in order to add interactivity to the eSB execution. Said interactivity can, for example, allow an operative to enter or confirm a command and to be informed of the progress of the execution of an eSB. It can also allow the exchange of data with other systems and authorize, for example, the implementation of a function of synchronization, resetting, switching the electricity supply to an item of equipment on/off, putting an item of equipment into operational mode, etc. It is thus possible, based on the configuration of the central configuration management system, to generate restore commands using such interactivity with a maintenance operative and/or another system.

Figure 2:
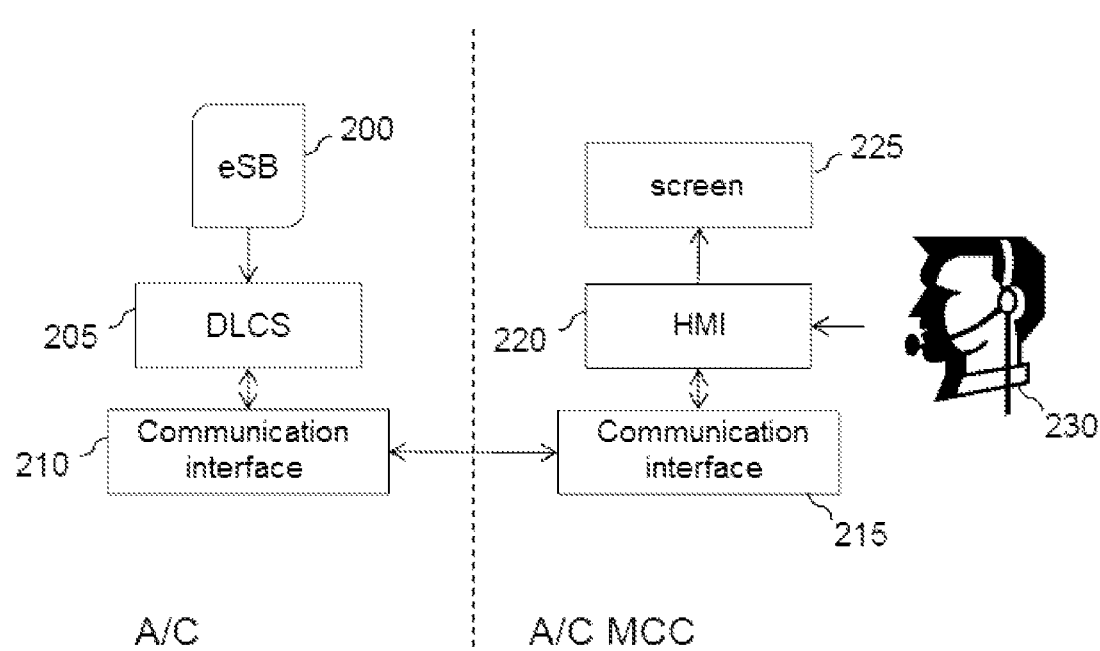
FIG. 2 shows an embodiment of a human-machine interface allowing the display of information based on eSB commands.

Information can be transmitted to an operative by a display, for example by generating pop-up type windows, on a screen of an aircraft or on a screen of a system on the ground depending on predetermined parameters. FIG. 2 shows an embodiment of a human-machine interface allowing the display of information based on eSB commands.

An eSB 200 is processed here by a central configuration management system 205. The eSB 200 comprises, for example, the following command:

<DISPLAY POPUP "Enter your login and password">

During the processing of said command, the central configuration management system 205 here calls a communication interface 210 in order to send the message to the system on which it must be displayed (here, by way of example, the configuration of the central configuration management system denotes a system on the ground). The communication interface 210 of the aircraft then transmits the message to a communication interface 215 of a system on the ground (an address of which is given by configuration). The system on the ground is here a Maintenance Control Center (MCC).

On receipt, the message is then transmitted to an interface 220 of the HMI type allowing data to be displayed on a screen 225 and data to be entered by an operative 230. The message "Enter your login and password" then appears on the screen 225.

Such an interface makes it possible to display simple messages and to display messages requesting confirmation or the entry of data such as a login and a password, an identification number, etc.

The interface implemented also makes it possible, preferably, to exchange data with other systems via, for example, a resource management system (system manager). The interface thus makes it possible, in particular, to transmit commands and requests to unlock an item of equipment and to allow it to be updated (e.g. switching to loading mode of an LRU (Line-Replaceable Unit) affected by an eSB in the process of execution) and reset an item of equipment following loading when the latter does not offer an automatic reset function.

The transmission of said commands and requests is advantageously complemented by management of the automatic relaunch of execution of a command depending on a selection criterion, for example the repeated execution of a command until a success message is obtained or for a predetermined period of time (allowing the processing of functions that cannot be interrupted for safety reasons).

Figure 3:
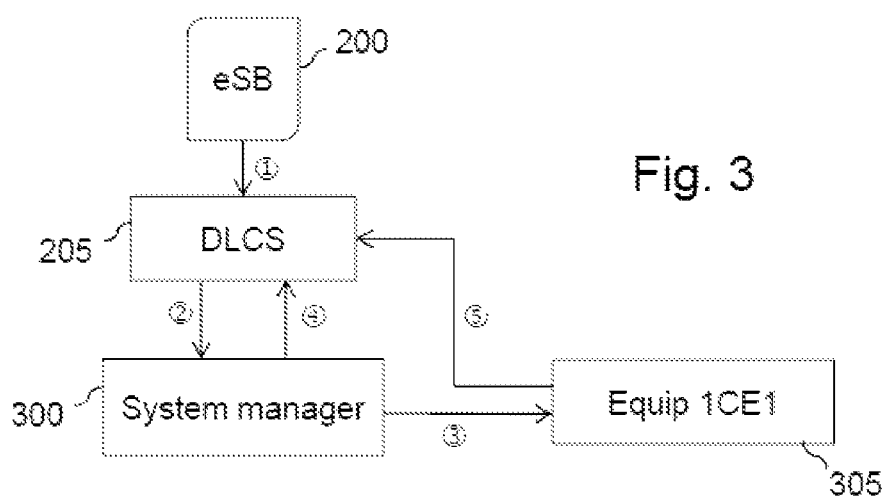
FIG. 3 shows an embodiment of an interface allowing the modification of the configuration mode of an item of equipment based on eSB commands so that it can be updated.

FIG. 3 shows an embodiment of an interface making it possible, based on eSB commands, to modify the configuration mode of an item of equipment, in order to allow it to be updated.

An eSB 200 is processed here by a central configuration management system 205 (step ☐). The eSB 200 comprises, for example, the following command:

<SENDREQUEST "Unlocking for update" FIN="1CE1">

During the processing of said command, the central configuration management system 205 calls the system manager 300 (step ☐) to request it to unlock the equipment involved (here the item of equipment 305 having the FIN code 1CE1). If the item of equipment 305 can be unlocked, the system manager 300 sends an unlock request to said item of equipment (step ☐) and informs the central configuration management system of this (step ☐) by a message of the "unlock OK" type. Otherwise, if the item of equipment 305 cannot be unlocked, the system manager 300 informs the central configuration management system of this by a message of the "unlock NOK" or "Call-back in x minutes" type. If the item of equipment 305 can be unlocked, the next command in the eSB, typically involving the loading of a software element onto the item of equipment 305 (e.g. "UpLoad FIN "1CE1SW1" with "PNR xx""), is executed (step ☐).

The interface also preferably allows the transmission of requests for configuration information to be obtained from particular items of equipment. Such requests sent to said items of equipment or to centralized configuration information management systems make it possible, in particular, to obtain configuration information concerning equipment that does not have a function of periodically transmitting its configuration.

The interface also allows, preferably, the transmission of commands and requests for switching the electricity supply to equipment on/off, making it possible, in particular, for an operative to change an item of equipment before the loading of a software element.

Finally, still according to a particular embodiment, the interface makes it possible to transmit test commands and requests of items of equipment in order to test their operation.

As previously described, the restore commands can use synchronization commands allowing for example certain loading or restart tasks, by using time delays of a predetermined duration or waiting for given events, to execute automatically, for example when the restart of an item of equipment is not immediate after updating, or involves re-establishing communication links. Such commands are, preferably, automatically generated from commands in the processed eSB, based on the configuration of the central configuration management system.

Figure 4:
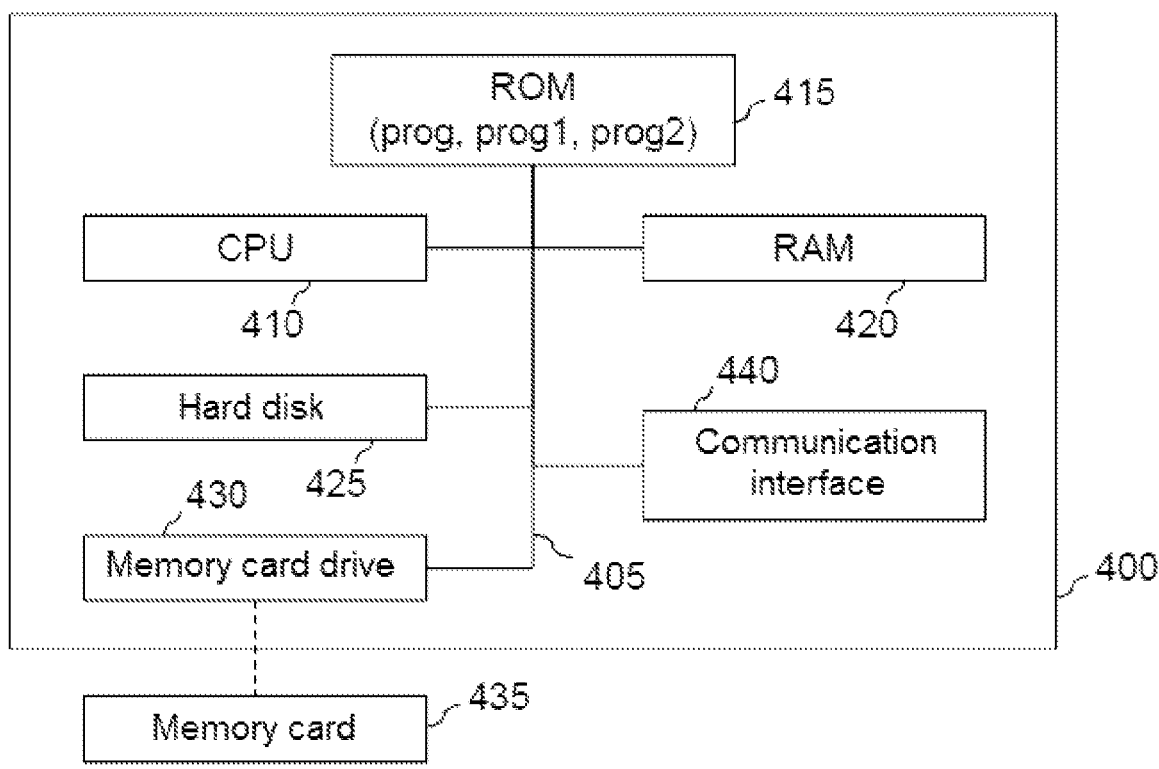
FIG. 4 shows diagrammatically a device suitable for implementing certain embodiments, at least partially, in particular the algorithm described with reference to FIG. 1.

FIG. 4 shows diagrammatically a device capable of implementing certain embodiments, at least partially, in particular the algorithm described with reference to FIG. 1. The device shown is preferably a standard device, for example a computer, calculator or server.

The device 400 here comprises an internal communication bus 405 to which are connected:

a central processing unit or microprocessor 410 (CPU, Central Processing Unit);

read only memory 415 (ROM) that can contain the programs necessary for implementing the invention;

random storage or cache memory 420 (RAM, Random Access Memory (RAM)) comprising registers capable of recording variables and parameters created and modified during the execution of the aforementioned programs; and a communication interface 440 capable of transmitting and receiving data to and from a communication network, wired or not.

Preferably, the device 400 also has the following elements:

a hard disk 425 that can contain the aforementioned programs and data processed or for processing according to the invention; and a memory card drive 430 capable of receiving a memory card 435, or any other external data storage system, and reading from or writing to it data processed or for processing according to the invention.

The internal communication bus allows the communication and interoperability between the different elements included in the device 400 or linked thereto. The representation of the internal bus is non-limitative and, in particular, the microprocessor is capable of communicating instructions to any element of the device 400 directly or via another element of the device 400.

The executable code of each program allowing the programmable device to implement the processes according to the invention can be stored, for example, on the hard disk 425 or in the read only memory 415.

According to a variant, the memory card 435 can contain data, in particular an eSB or a restore eSB and/or software elements for loading, as well as the executable code of the aforementioned programs which, once read by the device 400, is stored on the hard disk 425.

According to another variant, the executable code of the programs can be received, at least partially, via the communication interface 440, to be stored in the same way as described above.

More generally, the program(s) can be loaded onto one of the storage means of the device 400 before being executed.

The microprocessor 410 will control and manage the execution of the instructions or portions of software code of the program(s) according to the invention, instructions which are stored on the hard disk 425 or in the read only memory 415 or in the other aforementioned storage elements. When powered up, the program(s) that are stored in a non-volatile memory, for example the hard disk 425 or the read only memory 415, are transferred to the random access memory 420 which then contains the executable code of the program(s) according to the invention, as well as registers for storing the variables and parameters necessary for implementation of the invention.

The communication device containing the device according to the invention can also be a programmed device. Said device then contains the code of the computer program(s), for example fixed in an Application-Specific Integrated Circuit (ASIC).

The present invention has been described and illustrated in the present detailed description with reference to the attached figures. However, the present invention is not limited to the embodiments given. Other variants and embodiments may be deduced and implemented by a person skilled in the art of the invention on reading the present description and the attached figures.

In particular, it is noted that the combining and skilled sequencing of interface commands (with systems) and synchronizing with commands of the CheckConf type make it possible to produce task sheets for maintenance operatives suitable, in particular, for replacing mechanical parts.

In the claims, the verb "to comprise" does not exclude other elements or other steps. The singular indefinite article does not exclude the plural. A single processor or several other units can be used to implement the invention. The different features presented and/or claimed can be advantageously combined. Their presence in the description or in different dependent claims in no way excludes the possibility of combining them. The reference signs should not be understood as limiting the scope of the invention.

The invention claimed is:

1. A computerized method for the management of software updates of a set of equipment of a system based on instructions in a service bulletin, said method being characterized in that the instructions in said service bulletin are accessible in the form of commands and in that it comprises the following steps,
   selecting and executing a command directed to at least one instruction in said service bulletin, said selected command being directed to the modification of the configuration of an item of equipment of said system;
   if the result of executing said selected command conforms to an expected result, generating, according to the type of said executed command, at least one restore command, said at least one restore command allowing the reconfiguration of said equipment to its configuration preceding the execution of said selected command;
   if the result of executing said selected command does not conform to an the expected result, executing at least one previously generated restore command stored in a restore service bulletin; and
   executing a configuration test command of said equipment, said configuration test command being executed before executing said selected command, at least one parameter of said generated restore command corresponding to a result of executing said configuration test command.

2. The method according to claim 1, further comprising a step of generating a configuration test restore command of said equipment, at least one parameter of said configuration test restore command corresponding to a result of executing said configuration test command.

3. The method according to claim 1, according to which said configuration test command of said equipment is directed to at least one instruction in said service bulletin.

4. The method according to claim 1, further comprising a step of concatenation of previously generated restore commands, said previously generated restore commands being concatenated in an order defined by a sequence number associated with said previously generated restore commands.

5. The method according to claim 1, further comprising a step of generating a restore command for displaying a message intended for an operator.

6. The method according to claim 5, according to which said message display restore command is generated when said selected command is directed to the configuration of a new item of equipment.

7. The method according to claim 1, further comprising a step of evaluating a selection criterion in the event of failure of execution of said selected command, said step of execution of said selected command being repeated if said selection criterion is verified.

8. The method according to claim 7, according to which said selection criterion is based on a number of software elements successfully loaded onto said equipment, a number of software elements for loading onto said equipment, a number of items of equipment the configuration of which must be modified, and/or an error code of execution of said selected command.

9. The method according to claim 7, further comprising a step of counting the number of executions of said selected command, the execution of said selected command only being possible a limited number of times determined by a pre-set threshold.

10. The method according to claim 1, further comprising a step of generating a synchronization restore command for the execution of restore commands.

11. The method according to claim 1, further comprising a step of generating a restore command for receiving at least one item of data for the execution of restore commands.

12. A device comprising at least one processing unit configured to carry out each of the steps of the method according to claim 1.

13. An aircraft comprising the device according to claim 12.

* * * * *